March 20, 1945.    L. S. HOUGHTON ET AL    2,371,998
THERMOSTAT
Filed Jan. 26, 1942
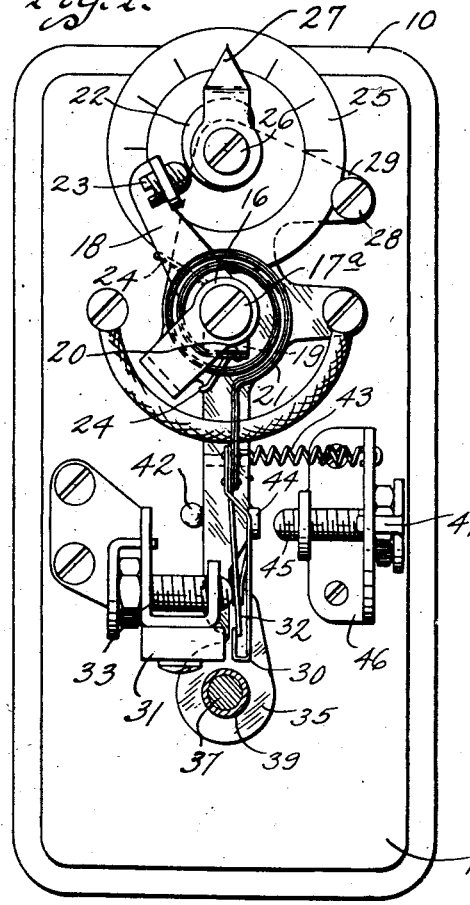
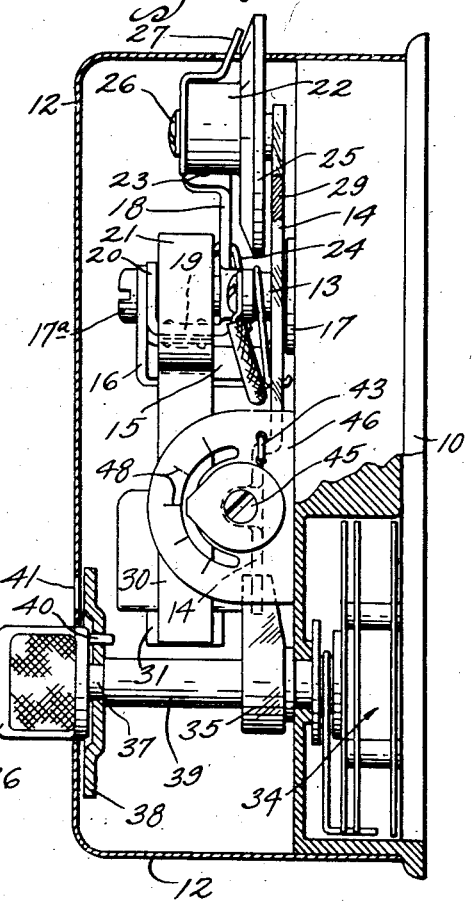
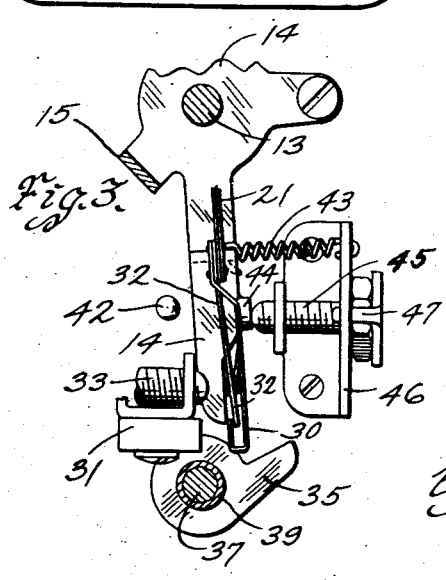
Inventors
Lysle S. Houghton
and John T. Rothwell
by Bair & Freeman
Attys.

Patented Mar. 20, 1945

2,371,998

UNITED STATES PATENT OFFICE 2,371,998

THERMOSTAT

Lyle S. Houghton, Goshen, and John J. Rothwell, Elkhart, Ind., assignors to Penn Electric Switch Co., Goshen, Ind., a corporation of Iowa Application January 26, 1942, Serial No. 428,260

4 Claims. (Cl. 200—139)

Our invention relates to a thermostat wherein timer mechanism is included for the purpose of setting the thermostat for operation at an other-than-normal temperature for a predetermined period of time.

One object of the invention is to provide a thermostat which may be inexpensively manufactured to include a relatively simple watch movement as a timer mechanism and a control knob for setting the timer mechanism for the desired period of time during which the thermostat is to operate at its other-than-normal temperature.

Another object is to provide a simple construction for the thermostat whereby the timer mechanism may cooperate therewith to effect setting of the thermostat at a different temperature than the usual setting dial thereof indicates during the timing period.

More particularly, it is our object to provide timer actuated mechanism for a thermostat wherein mounting means for a temperature responsive element and its normal adjusting means is operated to a normal position by the timer mechanism so that when it is desirable to set the thermostat for other-than-normal temperature, such as for night set-back purposes, when the thermostat is used in connection with an oil burner or the like, the timer actuated mechanism, when set, will effect movement of the mounting means to a different-than-normal position.

With these and other objects in view, our invention consists in the construction, arrangement and combination of the various parts of our device whereby the objects contemplated are attained, as hereinafter more fully set forth, pointed out in our claims and illustrated in the accompanying drawing. Although the invention is susceptible of a variety of embodiments, it is unnecessary to fully describe and illustrate more than one in order to give a full understanding of the invention both from its structural and functional standpoints. Accordingly, we have illustrated a preferred and desirable embodiment of the invention in the accompanying drawing, in which:

Figure 1 is a front elevation of a thermostat embodying our invention with the casing removed and with a setting shaft for the timer mechanism shown in section;

Figure 2 is a side elevation of the thermostat with a part of the base broken away and other parts shown in section, and with the casing for the thermostat shown in section; and Figure 3 is a view similar to Figure 1, showing certain parts of the thermostat in a different position, as during the timing period.

On the accompanying drawing we have used the reference numeral 10 to indicate a base, and 12 a casing thereon. A pivot stud or post 13 extends from the base 10 and has pivotally mounted thereon a mounting lever 14. The mounting lever 14 has a yoke portion 15, the arm of which is indicated at 16, and which arm is also pivoted on the stud or post 13. The stud or post 13 has a flange 17 for mounting it on the base 10, and a screw 17a is used to hold the lever 14 in position on the stud.

Rotatably mounted on the stud 13 is a lever 18 having a yoke portion 19, the arm of which is indicated at 20. The yoke 19 has riveted thereto a spirally coiled bimetal element 21. The position of this element is adjustable to change the range of operation of the thermostat by means of a cam 22 which swings the lever 18 with relation to the mounting lever 14 by contact with a screw 23. The screw 23 is a factory adjustment and in operation is biased to engage the cam 22 by a spring 24 coiled around the stud 13 and having its ends engaging edges of the levers 14 and 18, as shown in Figures 1 and 2.

The cam 22 is formed on an indicating dial 25, the cam and dial being rotatable on a screw 26 mounted in the lever 14. A pointer 27 cooperates with the dial to indicate the various temperatures to which the dial may be set. The dial may be locked in any desired position by a lock screw 28 threaded into an extension 29 of the mounting lever 14.

The bimetal element 21 has an armature arm 30 to cooperate with a permanent magnet 31 to secure snap action. A movable floating contact 32 is carried by the bimetal element 21 and is adapted to engage and disengage with respect to a stationary contact 33.

A timer mechanism, the clockworks part of which is indicated generally at 34, is used in connection with our thermostat. The clockworks mechanism is not shown in detail, as it is fully shown and described in the copending application of Rothwell and Shaw, Serial No. 405,360, filed August 4, 1941. The essential parts of the timer mechanism for the present application are an actuating arm 35 and a control knob 36 for setting the timer mechanism. The knob 36 is rotatable on a post 37, and when rotated effects rotation of an indicating dial 38, a sleeve 39 and the actuating element 35, as well as winding the clockworks mechanism, as fully described in the copending application just referred to. The actuating element 35 and the dial 38 are secured to the sleeve 39, and the dial is driven by a pin 40 projecting from the knob 36. Suitable indicia in hours, minutes or the like are printed on the face of the dial 38 and observable through a sight opening 41 in the casing 12.

The actuating element 35, it will be noted, is positioned so that it engages the lower end of the mounting lever 14. In so doing it moves the mounting lever to the normal position shown in Figure 1 against a stop 42 extending from the base 17. The lever in this case is moved against the bias of a spring 43 which tends to move the lever to a position where a stop portion 44 thereon engages an adjustable stop 45. The stop 45 is screw-threaded in a bracket 46 and has a pointer 47 cooperating with suitable indicia 48 on the bracket 46 to indicate the number of degrees in temperature set-back effected with relation to the thermostat during the timing period.

Practical operation

In the operation of our thermostat the parts are normally in the position of Figure 1, whereupon the switch contacts 32 and 33 open and close with relation to each other in the normal manner, and at whatever temperature the dial 25 has been set. When it is desirable to change the thermostat to a different setting for a predetermined period of time the knob 36 is rotated clockwise for winding the clockworks mechanism 34 and permitting the mounting lever 14 to move to set-back position, shown in Figure 3, with the stop 44 engaging the stop 45. The knob 36 is rotated until the desired time period is indicated through the sight opening 41, whereupon the knob 36 is released and the actuating element 35 starts rotating in a reverse direction under the power of the clockworks mechanism now returning to its normal position.

Adjacent the end of the timing period the actuating element 35 engages the mounting lever 14 and slowly moves it from the position of Figure 3 to the position of Figure 1 against the stop 42. The parts are now in normal position so that thereafter the thermostat will respond at whatever temperature the dial 25 is set until another timing period is initiated.

From the foregoing specification it will be obvious that we have provided a simple arrangement whereby a control device may be set for an other-than-normal operation for a predetermined period of time.

Although we have illustrated our invention in connection with a thermostat, it may, of course, be used with any kind of a condition responsive control device, the essential characteristics being that the winding of the timer mechanism sets the control element for operation at a different range and at the end of the timing period the control element is returned to its normal position.

Some changes may be made in the construction and arrangement of the parts of our device without departing from the real spirit and purpose of our invention, and it is our intention to cover by our claims any modified forms of structure, or use of mechanical equivalents, which may be reasonably included within their scope.

We claim as our invention:

1. In a thermostat, a temperature responsive element, a control element operated normally thereby at one predetermined temperature, and timer actuated means for setting said temperature responsive element for operation at another predetermined temperature for a predetermined period of time comprising a mounting element on which said temperature responsive element is carried, adjusting means for said temperature responsive element also carried by said mounting element, settable timer mechanism, and an operative connection between said timer mechanism and said mounting element for changing the position of the mounting element and the adjusting means, and thereby changing the position of said temperature responsive element from a normal position to a time controlled position, said timer mechanism returning said mounting element to normal position during the end portion only of the timing period for which the timer mechanism is set.

2. In a thermostat, a base, a mounting lever pivoted thereon, means connected with mounting lever to bias it to swing in one direction, a stop to limit the movement of said lever in said direction with respect to said base, timer mechanism including a time actuated element engageable with said mounting lever to normally retain it in a position spaced from said stop, said time actuated element being movable upon setting of said timer mechanism to a position permitting said mounting lever to engage said stop and thereafter returning during the timing period with engagement of the time actuated element with the mounting lever and movement of the mounting lever away from said stop occurring during the latter portion of said timing period, a bimetal element carried by said mounting lever, adjusting means therefor also carried by said mounting lever, and contacts controlled by said bimetal element.

3. In a control device, a base, a mounting lever pivoted thereon, means biasing said mounting lever to swing in one direction, a stop to limit the movement of the lever in said direction with respect to said base, timer mechanism including a time actuated element engageable with said mounting lever to normally retain it in a position spaced from said stop and movable upon setting of said timer mechanism to a position permitting said mounting lever to engage said stop said actuated element, upon passing through a time period as a result of such setting, disengaging said mounting lever from said stop during the latter portion only of said time period, a condition responsive element and adjusting means therefor both carried by said lever, and switch contacts controlled by said condition responsive element said time actuated element being movable, after setting, in a return direction during a major portion and a minor portion of a timing period, said mounting lever remaining against said stop during said major portion and moved away from said stop to said spaced position during said minor portion of said timing period.

4. In a control device, a base, a mounting lever pivoted thereon, means biasing said mounting lever to swing in one direction, a stop to limit the movement of the lever in said direction with respect to said base, timer mechanism including a time actuated element cooperating with said mounting lever to normally retain it in a position spaced from said stop and movable upon setting of said timer mechanism to a position permitting said mounting lever to engage said stop, a condition responsive element mounted on said mounting lever, and movable bodily therewith and a control element operated by said condition responsive element.

LYLE S. HOUGHTON.
JOHN J. ROTHWELL.